United States Patent
Takanashi

(10) Patent No.: US 10,504,486 B2
(45) Date of Patent: Dec. 10, 2019

(54) DISPLAY APPARATUS AND CONTROL METHOD THEREOF

(71) Applicant: CANON KABUSHIKI KAISHA, Tokyo (JP)

(72) Inventor: Ikuo Takanashi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 2 days.

(21) Appl. No.: 15/499,661

(22) Filed: Apr. 27, 2017

(65) Prior Publication Data

US 2017/0323618 A1 Nov. 9, 2017

(30) Foreign Application Priority Data

May 9, 2016 (JP) .................. 2016-094172

(51) Int. Cl.

| | |
|---|---|
| G09G 5/02 | (2006.01) |
| G09G 5/10 | (2006.01) |
| G06F 3/0484 | (2013.01) |
| G09G 3/3208 | (2016.01) |
| G09G 3/36 | (2006.01) |
| G09G 5/00 | (2006.01) |

(52) U.S. Cl.
CPC ........... *G09G 5/10* (2013.01); *G06F 3/04847* (2013.01); *G09G 3/3208* (2013.01); *G09G 3/3607* (2013.01); *G09G 5/006* (2013.01); *G09G 3/36* (2013.01); *G09G 2320/0233* (2013.01); *G09G 2320/0271* (2013.01); *G09G 2320/0606* (2013.01); *G09G 2320/0626* (2013.01); *G09G 2320/0646* (2013.01); *G09G 2320/08* (2013.01); *G09G 2340/12* (2013.01); *G09G 2354/00* (2013.01); *G09G 2360/16* (2013.01)

(58) Field of Classification Search
CPC .............................. G06F 3/04847; G09G 5/10
See application file for complete search history.

(56) References Cited

U.S. PATENT DOCUMENTS

| | | | | |
|---|---|---|---|---|
| 2002/0099257 A1* | 7/2002 | Parker | .................. | A61M 21/00 600/27 |
| 2008/0068491 A1* | 3/2008 | Yuyama | ................. | H04N 5/235 348/362 |
| 2008/0316374 A1* | 12/2008 | Koike | ................ | H04N 13/0406 349/1 |
| 2009/0034867 A1* | 2/2009 | Rempel | ..................... | G06T 5/30 382/264 |
| 2016/0239196 A1* | 8/2016 | Takahashi | ......... | H04N 5/23216 |

FOREIGN PATENT DOCUMENTS

| | | |
|---|---|---|
| JP | 11-252590 A | 9/1999 |
| JP | 2010-014987 A | 1/2010 |

* cited by examiner

*Primary Examiner* — Charles Tseng
(74) *Attorney, Agent, or Firm* — Canon U.S.A., Inc. IP Division

(57) ABSTRACT

A display apparatus includes a display unit that displays an image based on an input image and a display control unit that controls the display unit based on the input image. The display control unit controls the display unit in such a manner as to display a value indicative of specific luminance as display luminance in which pixels with predetermined pixel values of the input image are displayed on the display unit.

20 Claims, 9 Drawing Sheets

DISPLAY APPARATUS AND CONTROL METHOD THEREOF

BACKGROUND OF THE INVENTION

Field of the Invention

The aspect of the embodiments relates to a display apparatus that displays images based on image signals and a control method thereof.

Description of the Related Art

In recent years, there have been defined formats for image signals capable of recording wider luminance ranges (dynamic ranges) than conventional dynamic ranges. In the case of editing images recorded in these formats, a signal value corresponding to reference brightness of gray, white, or the like may be used with luminance for display on a display apparatus as an index.

There are display apparatuses that can control a range of signal values for display on the display apparatuses (display range) within a range of possible signal values of an input image signal. Japanese Patent Laid-Open No. 2010-014987 discloses a liquid crystal display apparatus that can amplify the signal values of an input image signal and reduce as necessary the amount of light emission from a backlight according to the amount of amplification. According to this liquid crystal display apparatus, it is possible to restrict the display range on the liquid crystal display apparatus within the dynamic range of an input image signal, and suppress a change in the range of luminance for display.

SUMMARY OF THE INVENTION

A first embodiment of a display apparatus includes: a display unit that displays an image based on an input image; a conversion unit that converts the input image to generate a converted image based on a display range as a dynamic range to be displayed on the display unit within a dynamic range of the input image; a control unit that controls the display unit based on the display range and a maximum value of luminance for display as a maximum value of luminance to be displayed on the display unit in such a manner as to display information indicative of luminance with which a signal value of the input image indicative reference brightness is displayed on the display unit.

Further features of the disclosure will become apparent from the following description of exemplary embodiments (with reference to the attached drawings).

DESCRIPTION OF THE EMBODIMENTS

Embodiments of the disclosure will be explained below with reference to the drawings. The technical scope of the disclosure is determined by the claims and is not limited to the examples explained below. In addition, all of combinations of features described in relation to the examples are not essential to the disclosure. The contents of the specification and the drawings are mere exemplification and should not be considered as limiting the aspect of the embodiments. Various modifications of the disclosure are possible based on the gist of the aspect of the embodiments, and they are not excluded from the scope of the aspect of the embodiments. That is, all combinations of the examples and the modification examples are included in the disclosure.

A display apparatus 1 of the aspect of the embodiments displays information indicating luminance with which a signal value indicative of reference brightness is displayed based on a display range as a range to be displayed with gradation on the display apparatus 1 within a dynamic range of an input image and a maximum value of luminance displayed on the display apparatus 1.

Figure 1:
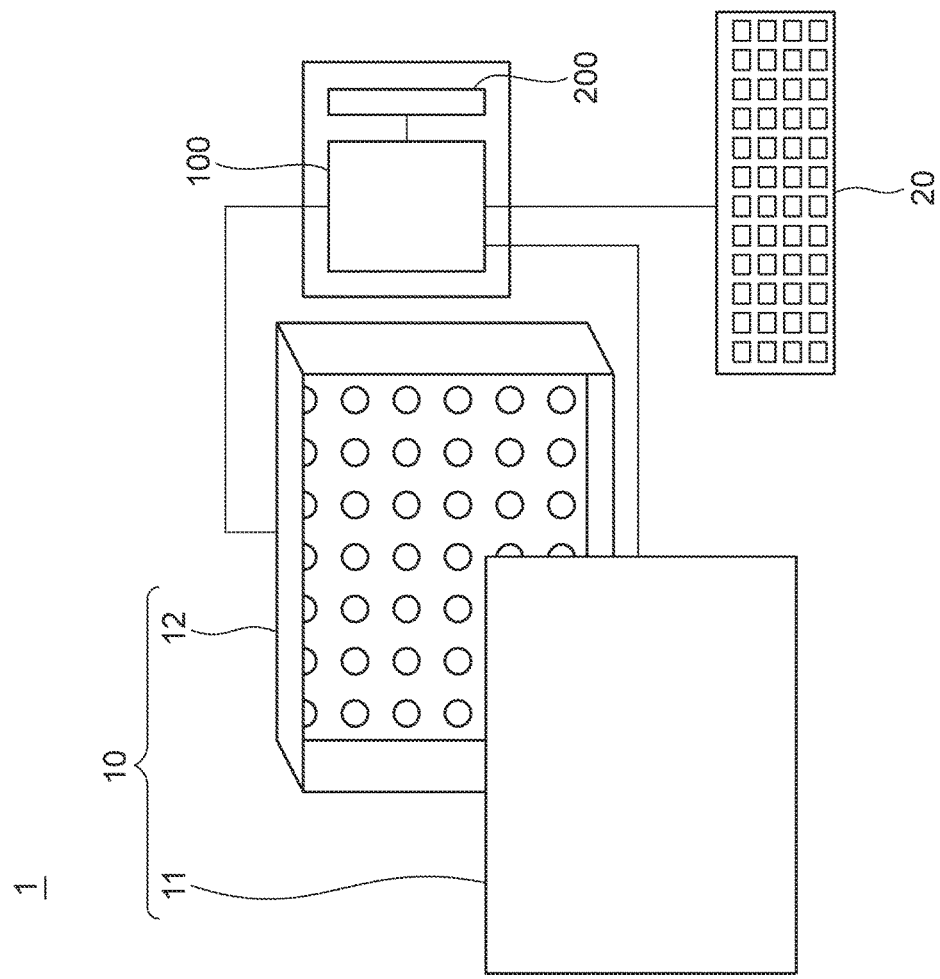
FIG. 1 is an apparatus configuration diagram of a display apparatus.

FIG. 1 is an apparatus configuration diagram of the display apparatus 1. The display apparatus 1 includes a display unit 10, a control unit 100 that controls the display unit 10, a memory 200, and an operation unit 300.

The display unit 10 includes a display panel 11 and a backlight 12. The display panel 11 is a transmissive display panel that has a plurality of elements capable of controlling the transmission ratio of light according to an image signal. For example, the display panel 11 is a liquid crystal panel using liquid crystal elements. The display panel 11 may include a plurality of transmissive elements composed of Micro Electro Mechanical Systems (MEMS).

The backlight 12 is a lighting device that transmits light to the display panel 11. The backlight 12 includes one or more light sources. The backlight 12 controls the light emission amount of the light sources according to the set maximum value of luminance for display of the display apparatus 1. Alternatively, the backlight may control the respective brightness values of the light sources according to the input image signal.

The display unit 10 is not limited to a transmissive display with the transmissive display panel 11 and the backlight 12 as described above. The display unit 10 may be a self-luminous display such as an Organic Light Emitting Diode (OLED) display using OLEDs as elements.

The control unit 100 is a circuit board for controlling the operation of the display unit 10. For example, the control unit 100 is an arithmetic processing unit (processor). The control unit 100 controls the operation of the display unit 10 by reading programs, parameters, and others for controlling the operation of the display unit 10 from the memory 200 and executing processes described later. The control unit 100 may include a plurality of processors and one or more electronic circuits that execute some of the processes described later.

The memory 200 is a recording medium that stores programs and parameters executable by the arithmetic processing unit and allows the arithmetic processing unit to read the programs and parameters for the control unit 100 to control the operation of the display unit. The memory 200 may store image signals to be displayed on the display apparatus 1. The memory 200 is a recording medium such as a non-volatile hard disk, for example. The memory 200 may be a recording medium using a volatile semiconductor. The memory 200 may be composed of a plurality of recording media.

The operation unit 300 is an interface for inputting the user's instructions into the control unit 100. The operation unit 300 is an input device physically operated by the user to input information such as a keyboard or a mouse. The operation unit 300 may operate the OSD displayed on the display apparatus 1 to input the user's instructions into the control unit 100.

Figure 2:
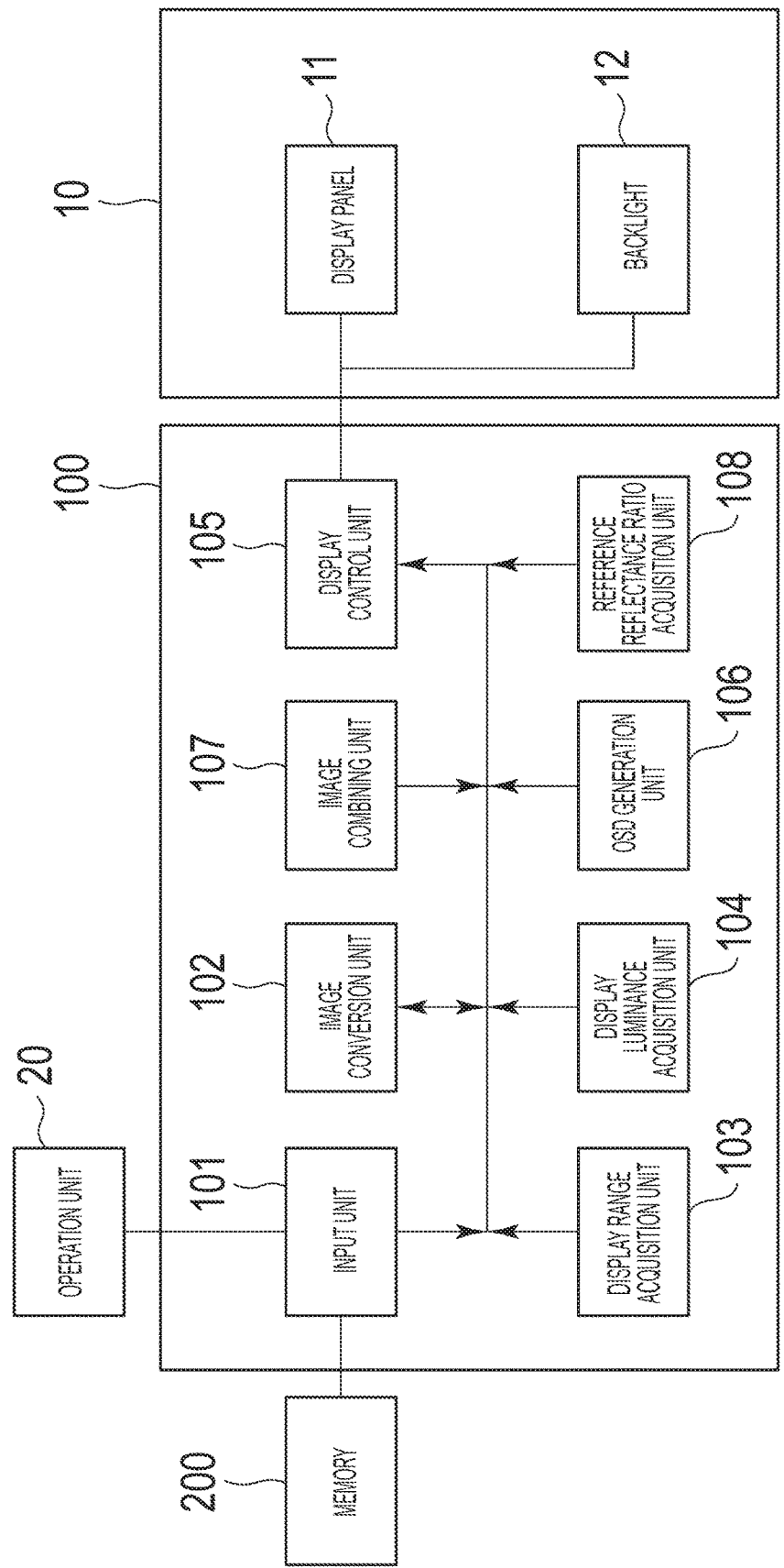
FIG. 2 is a block diagram of functional blocks of a control unit.

FIG. 2 is a block diagram of functional blocks of the control unit 100. The control unit 100 includes an input unit 101, an image conversion unit 102, a display range acquisition unit 103, a display luminance acquisition unit 104, a display control unit 105, an OSD generation unit 106, an image combining unit 107, and a reference reflectance ratio acquisition unit 108. All these functional blocks can be implemented by hardware such as electronic circuits.

The input unit 101 is an interface into which input images and the user's instructions are input. For example, input images are input into the input unit 101 from the memory 200. In addition, the user's instructions are input into the input unit 101 from the operation unit 300. The input unit 101 produces outputs into the functional blocks of the control unit 100 depending on the kinds of the input information.

An image input into the input unit 101 will be explained. In the input image, signal values corresponding to brightness (pixel values) are designated for the pixels. For example, the brightness of the image as a source of the input image is expressed by "reflectance ratio." The reflectance ratio is a form of expressing the brightness of an image. In many cases, the brightness of a light-receiving object illuminated under environmental light is expressed by a reflectance ratio of about 0 to 100%, and the brightness of a light-emitting object such as an illumination light source or the sun brighter than the light-receiving object is expressed by a reflectance ratio of 100% or more. The correspondences between brightness and signal values are determined in advance according to the format of the input image.

In addition, in a photographing location, photographing is performed with appropriately adjusted exposure such that a reflectance ratio of 18% corresponds to a gray color with a density of 50%. At this time, the reflectance ratio of 18% is set as reference brightness and the signal value corresponding to the reflectance ratio of 18% is set as a reference signal value. The reference brightness may take on any value other than the reflectance ratio of 18%. For example, the reference brightness may be a reflectance ratio of 100% (white) or a reflectance ratio of 2% (black). The reference brightness can be any value other than the maximum value in the dynamic range.

In the case where any pixel with the signal value (pixel value) corresponding to the reference brightness in the input image is displayed on the display apparatus, the luminance may vary depending on the setting of the display range of the display apparatus.

Therefore, it is difficult for the user to recognize with what brightness the signal value corresponding to the reference brightness in the input image is displayed on the display apparatus.

Figure 3:
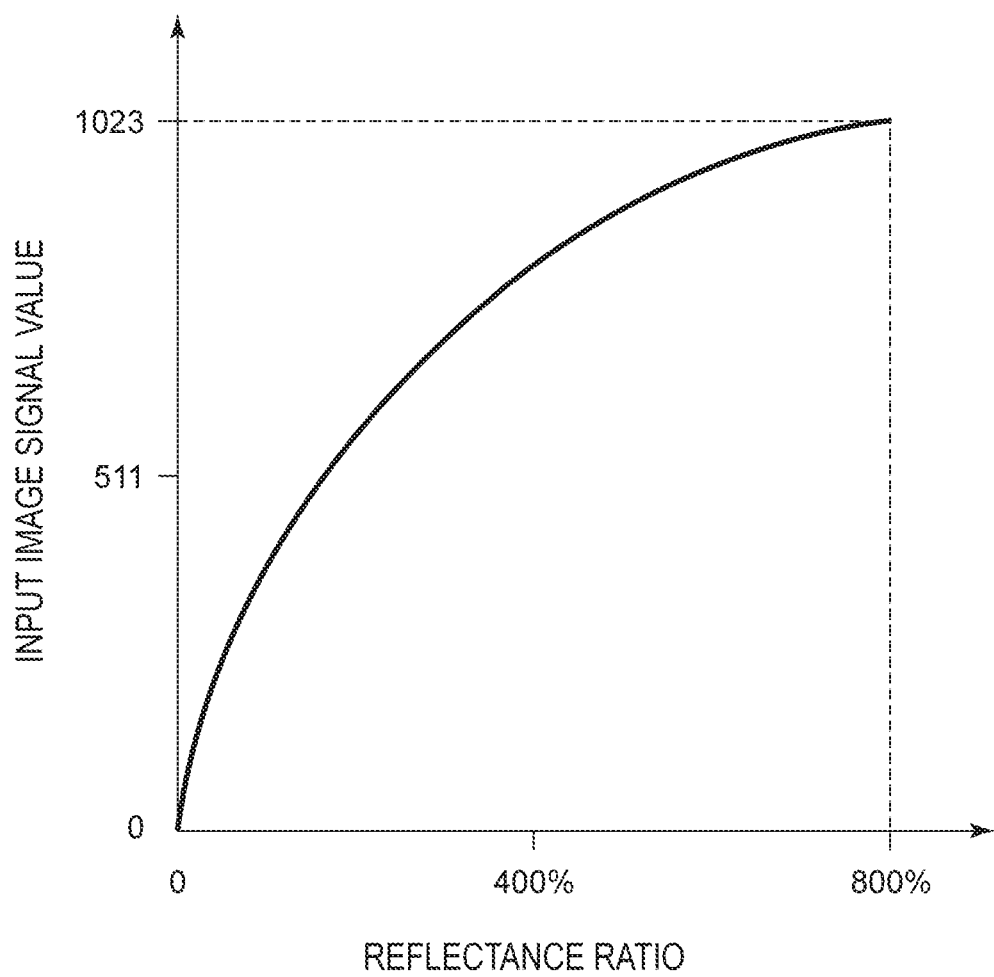
FIG. 3 is a schematic diagram illustrating a relation between reflectance ratios and the signal values of an input image.

FIG. 3 is a schematic diagram illustrating a relation between the reflectance ratios and the signal values of an input image. The horizontal axis of FIG. 3 indicates the reflectance ratios, and the vertical axis of FIG. 3 indicates the signal values of the input image. The pixel values of the input image are expressed by a 10-bit signal. For example, the input image is a 10-bit signal that corresponds to a dynamic range with a gamma of 2.6 and a reflectance ratio of 800%. The dynamic range and the display range are brightness ranges with the lower limit fixed to the minimum value close to black. Accordingly, these ranges are determined by showing the maximum brightness in the corresponding ranges. A signal value S1 of the input image corresponding to a reflectance ratio R (%) is expressed by Equation 1. The brightness is not limited to the reflectance ratio. For example, the pixel values of the input image may be determined based on the correspondences between absolute luminance values expressed by nit or cd/m² and the pixel values.

[Equation 1]

$$S1=(R(\%) \div 800(\%))^{1/2.6} \times 1023 \qquad \text{(Equation 1)}$$

The display range acquisition unit 103 acquires a display range as a range of display of an input image with gradation on the display apparatus 1 within the dynamic range of the input image, and outputs the same to the image conversion unit 102 and the OSD generation unit 106. The display range acquisition unit 103 acquires the display range under the user's instruction. Alternatively, the display range acquisition unit 103 may acquire from the memory 200 the display range preset according to the maximum value of luminance for display available on the display unit 10. For example, the display range acquisition unit 103 acquires 400% as a display range Ra under the user's instruction.

The display luminance acquisition unit 104 acquires a maximum value of luminance for display Bl as the maximum value of luminance displayed on the display apparatus 1 and outputs the same to the OSD generation unit 106 and the display control unit 105. The maximum value of luminance for display Bl is display luminance displayed when an all-white image is displayed on the display apparatus 1. The display luminance acquisition unit 104 acquires the maximum value of luminance for display Bl under the user's instruction. Alternatively, the display luminance acquisition unit 104 may acquire the maximum value of luminance for display Bl available on the display unit 10 and stored in advance in the memory 200. For example, the display luminance acquisition unit 104 acquires 400 nits as the maximum value of luminance for display Bl.

The reference reflectance ratio acquisition unit 108 outputs the reference brightness within the dynamic range of the input image and outputs the same to the OSD generation unit 106. The reference reflectance ratio acquisition unit 108 acquires the reference brightness under the user's instruction. The reference reflectance ratio acquisition unit 108 may also acquire the reference brightness stored in advance in the memory 200. For example, the reference reflectance ratio acquisition unit 108 acquires a reflectance ratio of 100% as the reference brightness.

The image conversion unit 102 converts the dynamic range of the input image into the display range Ra acquired by the display range acquisition unit 103 to generate a converted image and outputs the same to the display control unit 105 or the image combining unit 107. The image conversion unit 102 converts a signal in the input image within a range not included in the display range Ra into the upper limit of the converted image, and converts the range of the signals included in the display range into a possible range of the converted image.

The image conversion unit 102 uses the acquired display range Ra to convert the signal value S1 of the input image into a signal value S2 of the converted image. For example, the image conversion unit 102 uses Equation 2 to convert the signal value S1 of the input image into the signal value S2 of the converted image.

[Equation 2]

$$S2=((800(\%)\times(S1\div1023)^{2.6})\div Ra(\%))^{1/2.2}\times1023 \quad \text{(Equation 2)}$$

In Equation 2, 2.2 is a value indicating the display characteristics of the display panel 11, which is a gamma value. The gamma value is a characteristic value varying depending on the display unit 10. The converted image is also expressed by a 10-bit signal as well as the input image. The input image and the converted image may also be expressed by signals of 8 bit or 12 bit or more. The bit counts indicative of the input image and the converted image may be different from each other.

Figure 4:
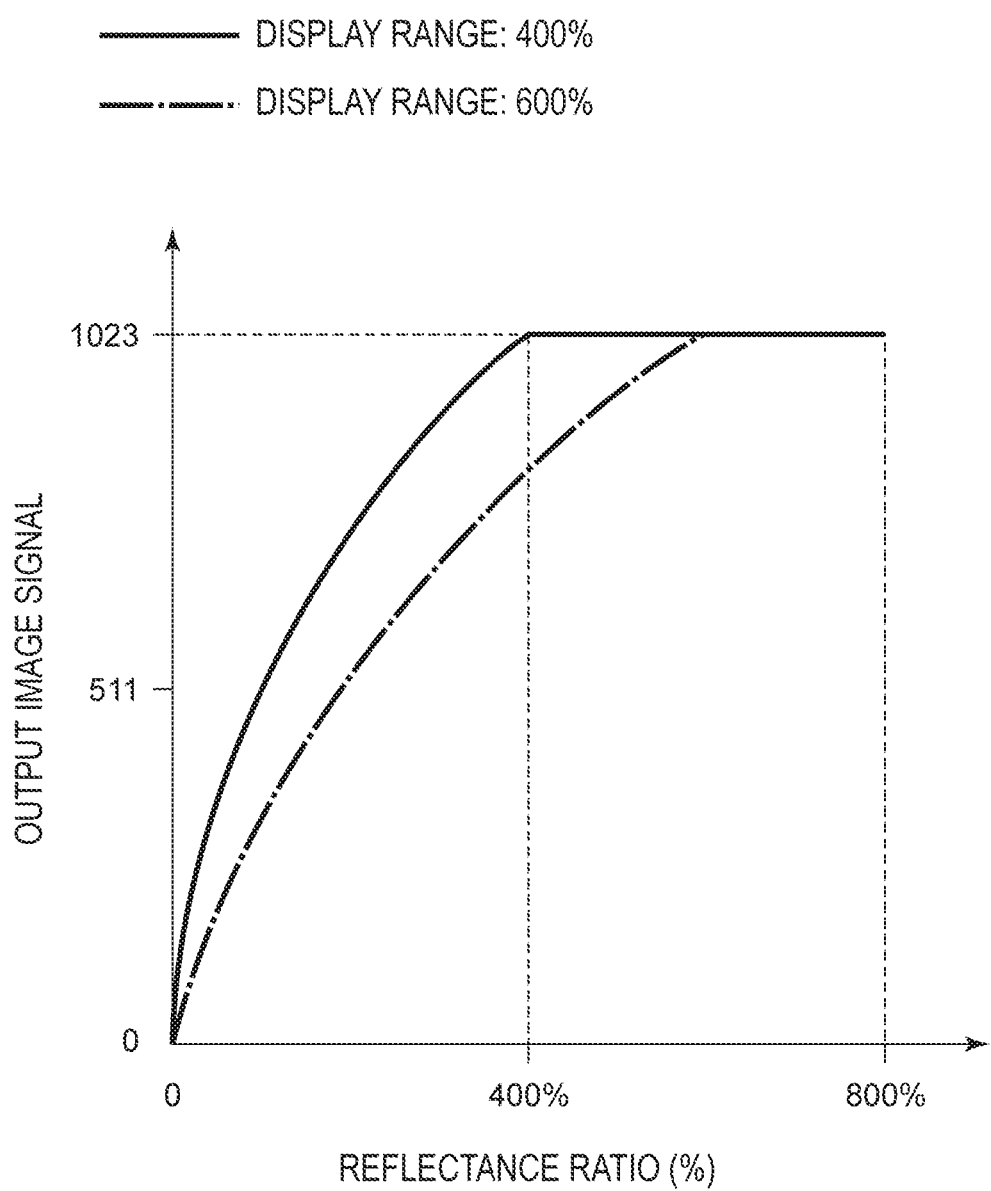
FIG. 4 is a schematic diagram illustrating a relation between the reflectance ratios and the signal values of a converted image generated by an image conversion unit.

FIG. 4 is a schematic diagram illustrating a relation between the reflectance ratios and the signal values S2 of the converted image generated by the image conversion unit 102. Referring to FIG. 4, the horizontal axis indicates the reflectance ratios and the vertical axis indicates the signal values S2 of the converted image. The solid line in FIG. 4 represents the relation between the reflectance ratios with a display range Ra of 400% and the signal value S2. The chain line in FIG. 4 represents the relation between the reflectance ratios in a display range Ra of 600% and the signal values S2.

Referring to FIG. 4, the range corresponding to the reflectance ratios beyond the display range Ra is converted into the upper limit 1023 within the possible range of the converted image. The range within the display range Ra is converted into a range of possible signal values of the converted image. In other words, the range included in the display range Ra corresponds to the converted image in such a manner as to have gradation. Having gradation means that different signal values are designated in the converted image when the brightness values designated for the pixels of the input value are different. Therefore, when the display unit 10 displays an image based on the converted image, the values of luminance with which the plurality of pixels with different designated brightness values are different from one another.

The image conversion unit 102 may perform gain control to amplify the signal values of the input image. For example, when half of the input image signal range is set as display range, the image conversion unit 102 amplifies the input image to obtain a double gain. The image conversion unit 102 may convert the signal values of the input image into the signal values of the converted image by Look-Up-Table (LUT).

The image conversion unit 102 outputs the converted image to the image combining unit 107 or the display control unit 105. When displaying an On Display Screen (OSD) image described later, the image conversion unit 102 outputs the converted image to the image combining unit 107. When not displaying the OSD image, the image conversion unit 102 outputs the converted image to the display control unit 105.

When the signal value corresponding to the reference brightness is designated for the pixels within the dynamic range of the input image, the OSD generation unit 106 acquires specific luminance Lr with which the pixels are displayed on the display apparatus 1. That is, the OSD generation unit 106 acquires the specific luminance Lr with which the pixel value corresponding to the reference brightness in the input image is displayed on the display apparatus 1. Then, the OSD generation unit 106 generates an OSD image indicative of the specific luminance Lr and outputs the same to the image combining unit 107. The OSD generation unit 106 calculates the specific luminance Lr using the display range Ra acquired from the display range acquisition unit 103 and the maximum value of luminance for display Bl acquired from the display luminance acquisition unit 104. Specific process performed by the OSD generation unit 106 will be described later.

The image combining unit 107 combines the converted image acquired from the image conversion unit 102 and the OSD image indicative of the specific luminance Lr acquired from the OSD generation unit 106 to generate a combined image, and outputs the same to the display control unit 105.

The display control unit 105 controls the display unit 10 to, with the converted image acquired from the image conversion unit 102 or the combined image acquired from the image combining unit 107 as a display image, display an image based on the display image with the maximum value of luminance for display Bl. Specifically, the display control unit 105 controls the respective transmittances of the pixels of the display panel 11 based on the display image, and controls the backlight 12 based on the maximum value of luminance for display Bl.

In the display image, the brightness (display luminance) L with which the pixels with the signal value S2 designated are displayed on the display unit 10 can be expressed by Equation 3.

[Equation 3]

$$L(\text{nit})=Bl(\text{nit})\times(S2\div1023)^{2.2} \quad \text{(Equation 3)}$$

Figure 5:
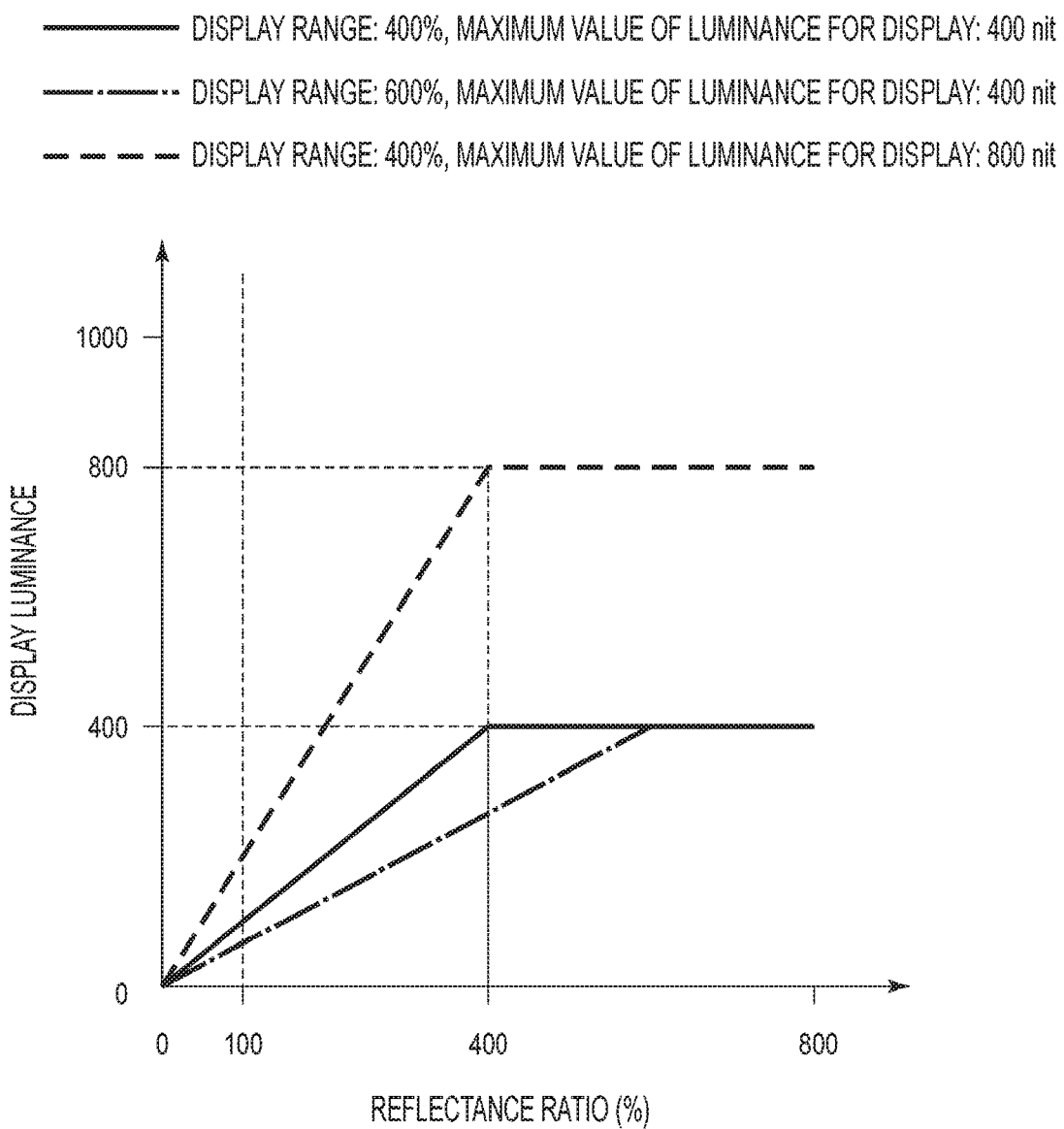
FIG. 5 is a schematic diagram illustrating a relation between the reflectance ratios and display luminance L of pixels corresponding to the signal values of the input image corresponding to the reflectance ratios.

FIG. 5 is a schematic diagram illustrating a relation between the reflectance ratios and the display luminance L of pixels corresponding to the signal values of the input image corresponding to the reflectance ratios. Referring to FIG. 5, the horizontal axis indicates the reflectance ratios and the vertical axis indicates the display luminance L.

The solid line in FIG. 5 represents a relation between the reflectance ratio R and the display luminance L when the display range Ra is 400% and the maximum value of luminance for display Bl is 400 nits. The long dashed and short dashed line in FIG. 5 represents a relation between the reflectance ratio and the brightness L when the display range Ra is 600% and the maximum value of luminance for display Bl is 400 nits. The dashed line in FIG. 5 represents a relation between the reflectance ratio R and the brightness L when the display range Ra is 400% and the maximum value of luminance for display Bl is 800 nits. The pixels corresponding to the signal values of the input image with the corresponding reflectance ratio not included in the display range Ra are displayed with the maximum value of luminance for display Bl. The pixels corresponding to the signal values of the input image not included in the display range Ra are displayed with gradation.

As illustrated in FIG. 5, the brightness L with which the pixels corresponding to the same reflectance ratio R are displayed on the display unit 10 varies depending on the setting values of the display range Ra and the maximum value of luminance for display Bl. For example, with the reference brightness as the reflectance ratio of 100%, the display luminance L corresponding to the reference brightness varies from about 66 to 200 nits depending on the setting values of the display range Ra and the maximum value of luminance for display Bl.

Figure 6:
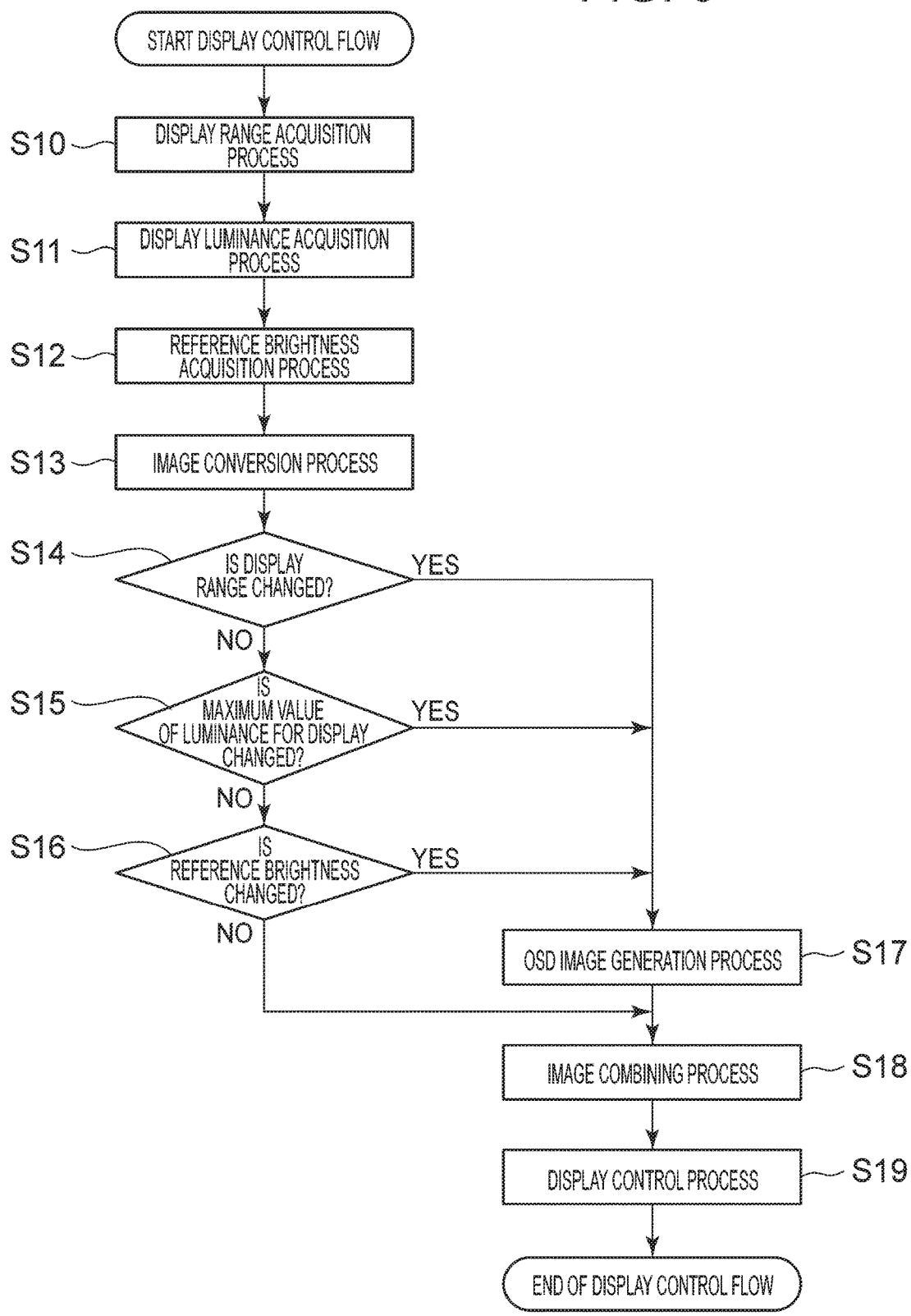
FIG. 6 is a flowchart of a display control flow of a display unit executed by the control unit.

A flow of display control of the display unit 10 executed by the control unit 100 will be described with reference to a flowchart. FIG. 6 is a flowchart of a display control flow of the display unit 10 executed by the control unit 100. The control unit 100 executes repeatedly the display control flow described in FIG. 6 during driving of the display apparatus 1.

When the display control flow is started, the display range acquisition unit 103 acquires the display range Ra at S10. The display range acquisition unit 103 may acquire the display range Ra under the user's instruction or may set the value stored in advance in the memory 200 as the display range Ra. The display range acquisition unit 103 outputs the acquired display range Ra to the image conversion unit 102 and the OSD generation unit 106. The process moves to S11.

At S11, the display luminance acquisition unit 104 acquires the maximum value of luminance for display Bl. The display luminance acquisition unit 104 may acquire the maximum value of luminance for display Bl under the user's instruction or may set a value stored in advance in the memory 200 as the maximum value of luminance for display Bl. The display luminance acquisition unit 104 outputs the acquired maximum value of luminance for display Bl to the display control unit 105 and the OSD generation unit 106. The process moves to S12.

At S12, the reference reflectance ratio acquisition unit 108 acquires the reflectance ratio indicative of the reference brightness. The reference reflectance ratio acquisition unit 108 outputs the acquired reflectance ratio indicative of the reference brightness to the OSD generation unit 106. The process moves to S13.

At S13, the image conversion unit 102 converts the signal value S1 of the input image into a converted image using the display range Ra and the maximum value of luminance for display Bl. For example, the signal value S1 of the input image is converted into the signal value S2 of the converted image using (Equation 2). The process moves to S14.

At S14, the OSD generation unit 106 determines whether the acquired display range Ra has been changed from a display range Ra' in the display control flow previously stored in the memory 200. When the OSD generation unit 106 determines that the display range Ra has been changed, the process moves to S17 and the OSD generation unit 106 starts the OSD image generation process. When the OSD generation unit 106 does not determine that the display range Ra has been changed, the process moves to S15.

At S15, the OSD generation unit 106 determines whether the acquired maximum value of luminance for display Bl has been changed from a maximum value of luminance for display Bl' in the display control flow previously stored in the memory 200. When the OSD generation unit 106 determines that the maximum value of luminance for display Bl has been changed, the process moves to S17 and the OSD generation unit 106 starts the OSD image generation process. When the OSD generation unit 106 does not determine that the maximum value of luminance for display Bl has been changed, the process moves to S16.

At S16, the OSD generation unit 106 determines whether the acquired reference brightness has been changed from reference brightness in the display control flow previously stored in the memory 200. When the OSD generation unit 106 determines that the reference brightness has been changed, the process moves to S17 and the OSD generation unit 106 starts the OSD image generation process. When the OSD generation unit 106 does not determine that the reference brightness has been changed, the process moves to S18 and the image combining unit 107 combines the OSD image generated in the previous display control flow with the converted image. That is, the control unit 100 starts the process of generating the OSD image according to a change in at least one of the display range Ra, the maximum value of luminance for display Bl, and the reference brightness.

At S17, based on the display range Ra and the maximum value of luminance for display Bl, the OSD generation unit 106 generates an OSD image 201 indicative of the specific luminance Lr with which the pixels having the signal values of the input image corresponding to the reference brightness are displayed on the display unit 10. The OSD generation unit 106 calculates the specific luminance Lr using the reference brightness, the display range Ra, and the maximum value of luminance for display Bl. Specifically, the OSD generation unit 106 calculates the specific luminance Lr by applying the reference brightness, the display range Ra, and the maximum value of luminance for display Bl to Equation 1, Equation 2, and Equation 3, respectively.

Figure 7A:
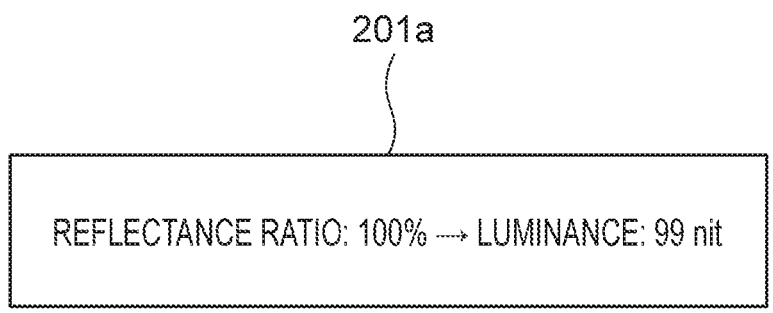
FIGS. 7A and 7B are schematic diagrams of OSD images generated by an OSD generation unit.
Figure 7B:
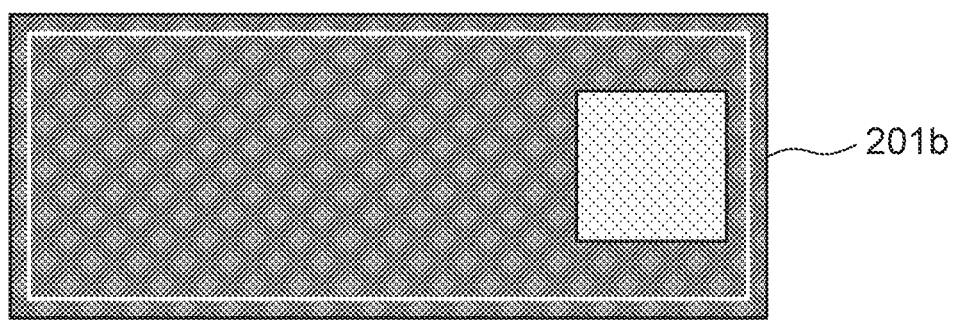

FIGS. 7A and 7B are schematic diagrams of OSD images 201a and 201b generated by the OSD generation unit 106. The OSD image 201a is an image indicating the reference brightness (reflectance ratio) and the corresponding specific luminance Lr. For example, the reference brightness is set to the reflectance ratio of 100%, and the corresponding specific luminance Lr is set to 99 nits.

The OSD image 201a illustrated in FIG. 7A is an OSD image indicating the reference brightness (reflectance ratio) and the corresponding specific luminance Lr by text information. The OSD image 201b illustrated in FIG. 7B is an OSD image indicating the text information indicative of the reference brightness and the corresponding specific luminance Lr by displaying a patch image composed of a signal value obtained by converting the signal value of the input image corresponding to the reference brightness. Displaying the OSD image 201b allows the user to grasp intuitively with what brightness the signal value indicative of the reference brightness is displayed on the display apparatus 1.

The OSD generation unit 106 outputs the generated OSD image 201 to the memory 200 and the image combining unit 107. The process moves to S18.

At S18, the image combining unit 107 combines the acquired OSD image 201 with the converted image to generate a combined image 202. When the OSD generation unit 106 does not generate the OSD image 201, the image combining unit 107 combines the OSD image 201 acquired from the memory 200 with the converted image.

Figure 8:
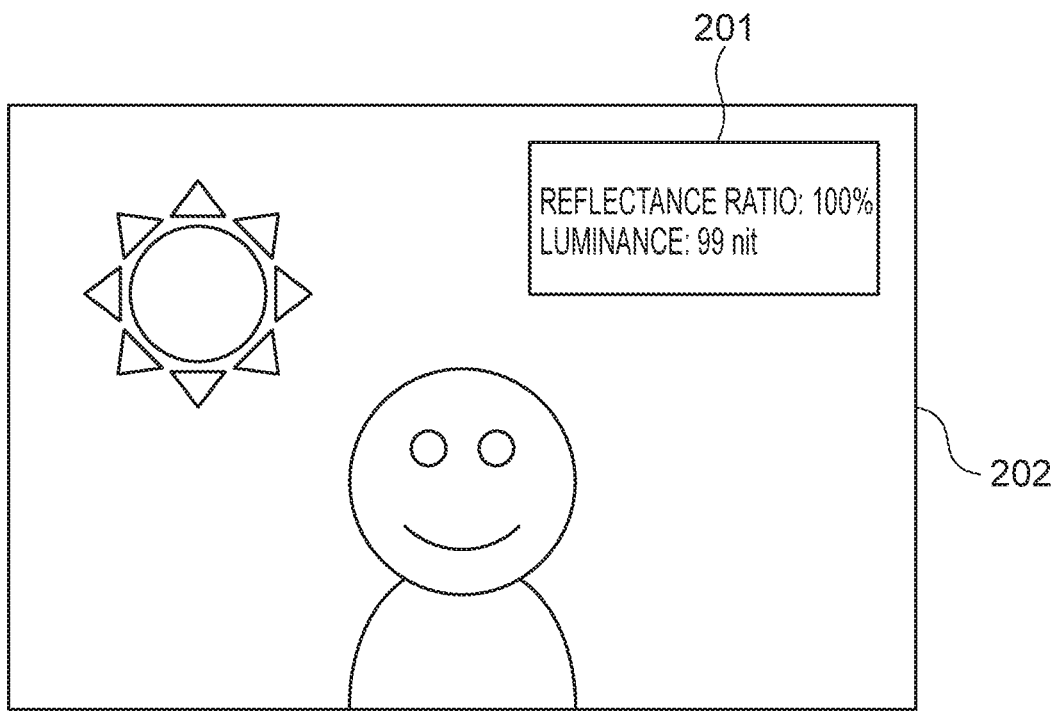
FIG. 8 is a schematic diagram of a combined image.

FIG. 8 is a schematic diagram of the combined image 202. The image combining unit 107 superimposes the OSD image 201 on the converted image for combination. The image combining unit 107 may generate the combined image 202 by combining the OSD image 201 with the outside of the converted image. Further, the image combining unit 107 can also perform scaling on the converted image to combine the OSD image 201 with the outside of the converted image. The image combining unit 107 outputs the combined image 202 to the display control unit 105. The process moves to S19.

At S19, the display control unit 105 controls the display unit 10 to display an image based on the combined image 202 with the maximum value of luminance for display Bl. S17 is executed and a series of display control flow is ended.

According to the display apparatus 1 of the example, it is possible to allow the user to grasp easily any change in the specific luminance Lr when the pixels designated with the signal value of the input image corresponding to the reference brightness are displayed on the display unit 10. Therefore, it is possible to allow the user to grasp the luminance of the signal value corresponding to the reference brightness in the display apparatus 1 depending on the setting conditions for the display range Ra and the maximum value of luminance for display Bl of the display apparatus 1.

(Other Examples)

In the input image, the signal values corresponding to information indicative of absolute luminance may be designated for the respective pixels. For example, the signal values of the pixels in the input image are designated based on characteristic information associated with the absolute luminance expressed by the unit of brightness (nit). The dynamic range of such an input image is a dynamic range expressed by the absolute luminance. For example, the dynamic range of the input image is 1000 nits.

When the dynamic range of the input image is expressed by the absolute luminance, the display range can also be expressed by the absolute luminance. For example, the display range is 400 nits. When the signal values of the input image are designated in association with the absolute luminance, the signal value indicative of the reference brightness is a signal value indicative of 100 nits, for example.

In the display apparatus 1 of the foregoing example, the image indicative of the reference brightness (reflectance ratio) and the specific luminance Lr is taken as the OSD image indicative of the specific luminance Lr with which the signal value of the input image indicative of the reference brightness is displayed on the display unit 10. However, the OSD image may be another image. The OSD image may be generated as an OSD image indicative of Graphical User Interface (GUI) for setting the display range Ra and the maximum value of luminance for display Bl, the reference brightness (reflectance ratio), and the specific luminance Lr.

Figure 9A:
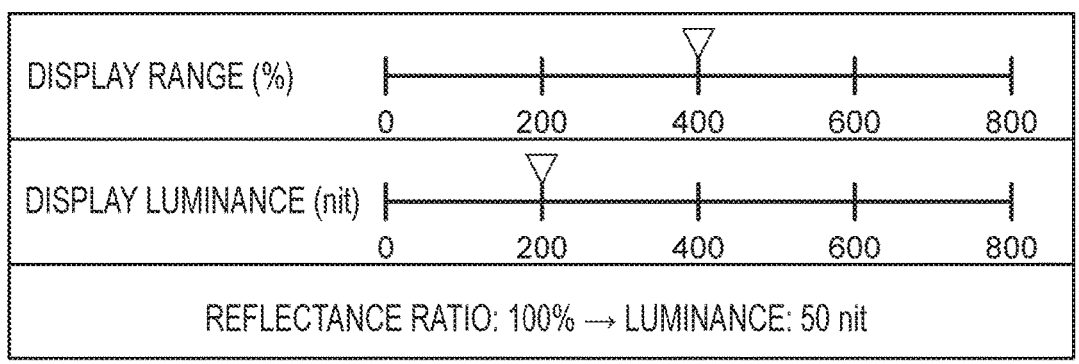
FIGS. 9A and 9B are schematic diagrams of OSD images composed of GUI images and images indicative of reference brightness (reflectance ratio) and specific luminance values.
Figure 9B:
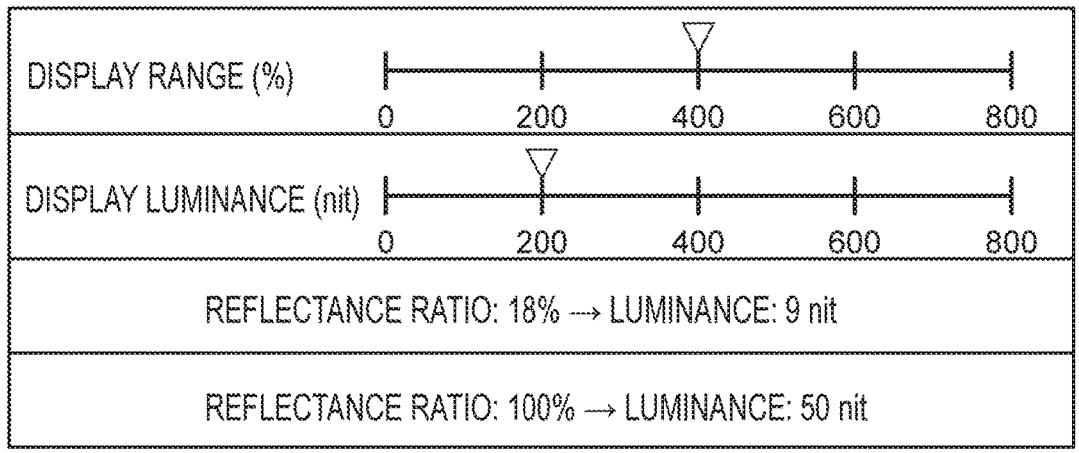

FIGS. 9A and 9B are schematic diagrams of OSD images composed of GUI images and images indicative of reference brightness (reflectance ratio) and specific luminance Lr. As illustrated in FIG. 9A, the user can operate triangular gauges on the GUI to designate the display range and the maximum value of luminance for display.

The indication of the specific luminance Lr with which the signal value indicative of the reference brightness of the input image is displayed on the display unit 10 may not be necessarily provided by the OSD image but may be provided by combining text data directly with the converted image. Further, the control unit 100 may control the display unit 10 to display the difference between a target luminance Lt set by the user and the specific luminance Lr. For example, the target luminance Lt corresponding to the reflectance ratio 100% is 100 cd/m$^2$. When the specific luminance Lr is lower than the target luminance Lt, the control unit 100 displays the specific luminance Lr in red text, and when the specific luminance Lr is equal to or more than the target luminance Lt, the control unit 100 displays the specific luminance Lr in black text.

The reference reflectance ratio acquisition unit 108 may acquire a plurality of reference brightnesses. For example, the reference reflectance ratio acquisition unit 108 acquires a reflectance ratio of 18% and a reflectance ratio of 100% as the reference brightnesses. In this case, the OSD generation unit 106 generates the OSD images indicative of the specific luminances Lr corresponding to these reflectance ratios. FIG. 9B is a schematic diagram of OSD images indicative of the plurality of reference brightnesses and the specific luminances Lr corresponding to the plurality of reference brightnesses.

The OSD image 201 may be combined with the converted image and displayed for a specific period of time. For example, the control unit 100 may display the OSD image 201 when at least one of the display range Ra, the maximum value of luminance for display Bl, and the reference brightness is changed by the user. Further, the control unit 100 can stop the combination of the OSD image 201 after a lapse of a predetermined period of time since the display of the OSD image 201 has started.

Accordingly, it is possible to allow the user to grasp with what brightness the signal value corresponding to the reference brightness is displayed on the display apparatus 1 depending on changes in the parameters. Further, it is possible to suppress the strangeness resulting from the OSD image 201 when the image based on the input image is viewed on the display apparatus 1. The specific period of time can be set arbitrarily by the user.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-094172, filed May 9, 2016, which is hereby incorporated by reference herein in its entirety.

What is claimed is:

1. A display apparatus, comprising:
a display device; and
at least one processor to perform operations as:
a generating unit configured to generate a second image by converting a dynamic range of a first image into a display range as a dynamic range to be displayed on the display device;
a setting unit configured to set the display range and a maximum luminance value of the display device, based on a user operation;
an acquisition unit configured to acquire a value indicative of a specific luminance, based on the display range and the maximum luminance value, the specific luminance being luminance in which at least one pixel corresponding to a target brightness level of the first image is displayed on the display device; and a control unit configured to control the display device to display a graphical user interface (GUI) image for setting, by a user, the display range and the maximum luminance value of the display device, and to display a value indicative of the target brightness level and the value indicative of the specific luminance.

2. The display apparatus according to claim 1, wherein the generating unit is configured to generate the second image by converting pixel values of pixels of the first image corresponding to brightness not included in the display range into an upper limit pixel value of the second image.

3. The display apparatus according to claim 1, wherein the target brightness level is at least one of a reflectance ratio of 18% and a reflectance ratio of 100%.

4. The display apparatus according to claim 1, wherein the acquisition unit executes a process of acquiring the specific luminance when at least one of the display range, the maximum luminance value, and the target brightness level is changed.

5. The display apparatus according to claim 1, wherein the control unit controls the display device to display the value indicative of the specific luminance in an absolute luminance value.

6. The display apparatus according to claim 1, wherein the control unit is configured to control the display device to display the value indicative of the target brightness level and the value indicative of the specific luminance in text format.

7. The display apparatus according to claim 1, wherein the GUI image includes a first gauge configured to be operated by the user to designate the display range and a second gauge configured to be operated by the user to designate the maximum luminance value.

8. A control method of a display device, the method comprising:

generating a second image by converting a dynamic range of a first image into a display range as a dynamic range to be displayed on the display device;

setting the display range and a maximum luminance value of the display device, based on a user operation;

acquiring a value indicative of a specific luminance, based on the display range and the maximum luminance value, the specific luminance being luminance in which at least one pixel corresponding to a target brightness level of the first image is displayed on the display device; and controlling the display device to display a graphical user interface (GUI) image for setting, by a user, the display range and the maximum luminance value of the display device, and to display a value indicative of the target brightness level and the value indicative of the specific luminance.

9. The control method according to claim 8, wherein in the generating, the second image is generated by converting pixel values of pixels of the first image corresponding to brightness not included in the display range into an upper limit pixel value of the second image.

10. The control method according to claim 8, wherein the target brightness level is at least one of a reflectance ratio of 18% and a reflectance ratio of 100%.

11. The control method according to claim 8, wherein the acquiring is intended to acquire the specific luminance when at least one of the display range, the maximum luminance value, and the target brightness level is changed.

12. The control method according to claim 8, wherein the controlling controls the display device to display the value indicative of the specific luminance in an absolute luminance value.

13. The control method according to claim 8, wherein the GUI image includes a first gauge configured to be operated by the user to designate the display range and a second gauge configured to be operated by the user to designate the maximum luminance value.

14. A non-transitory recording medium storing a program of instructions for causing a computer to perform a method comprising:

generating a second image by converting a dynamic range of a first image into a display range as a dynamic range to be displayed on a display device;

setting the display range and a maximum luminance value of the display device, based on a user operation;

acquiring a value indicative of a specific luminance, based on the display range and the maximum luminance value, the specific luminance being luminance in which at least one pixel corresponding to a target brightness level of the first image is displayed on the display device; and controlling the display device to display a graphical user interface (GUI) image for setting, by a user, the display range and the maximum luminance value of the display device, and to display a value indicative of the target brightness level and the value indicative of the specific luminance.

15. A display apparatus comprising:

a display device; and at least one processor to perform operations as:

a first controlling unit configured to control the display device to display a graphical user interface (GUI) image for setting, by a user, a display range of the display device and a maximum luminance value of the display device;

an acquiring unit configured to acquire a specific luminance, based on (1) a reference brightness level, (2) the display range of the display device and (3) the maximum luminance value of the display device, the specific luminance being luminance with which at least one pixel corresponding to the reference brightness level is displayed on the display device; and a second controlling unit configured to control the display device to display the reference brightness level and the specific luminance, in text format.

16. The display apparatus according to claim 15, wherein the at least one processor further performs operations as:

a generating unit configured to generate a second image from a first image by converting a dynamic range of a first image into the display range; and a third controlling unit configured to control the display device to display the second image.

17. The display apparatus according to claim 15, wherein the GUI image includes a first gauge configured to be operated by the user to designate the display range and a second gauge configured to be operated by the user to designate the maximum luminance value.

18. The display apparatus according to claim 15, wherein the second controlling unit controls the display device to display a plurality of types of the reference brightness level and a plurality of types of the specific luminance corresponding to the plurality of types of the reference brightness level.

19. The display apparatus according to claim 15, wherein the second controlling unit controls the display device to display the reference brightness level in a reflectance ratio.

20. The display apparatus according to claim 15, wherein the display range is a dynamic range displayed on the display device within a dynamic range of an inputted image.

* * * * *